United States Patent [19]
Nakanishi

[11] Patent Number: 5,834,878
[45] Date of Patent: Nov. 10, 1998

[54] VIBRATION WAVE DRIVING DEVICE AND APPARATUS HAVING THE SAME

[75] Inventor: Toru Nakanishi, Kamakura, Japan

[73] Assignee: Canon Kabushiki Kaisha, Tokyo, Japan

[21] Appl. No.: 925,616

[22] Filed: Sep. 9, 1997

[51] Int. Cl.⁶ .................................................. H02N 2/00
[52] U.S. Cl. ............................................................. 310/323
[58] Field of Search .............................................. 310/323

[56] References Cited

U.S. PATENT DOCUMENTS

| | | | |
|---|---|---|---|
| 5,164,629 | 11/1992 | Nakanishi | 310/323 |
| 5,225,734 | 7/1993 | Nakanishi | 310/323 |
| 5,313,132 | 5/1994 | Nakanishi | 310/348 |
| 5,493,164 | 2/1996 | Nogarede | 310/323 |
| 5,508,580 | 4/1996 | Maeno et al. | 310/323 |
| 5,686,776 | 11/1997 | Takagi et al. | 310/323 |
| 5,726,519 | 3/1998 | Gonnard et al. | 310/323 |
| 5,747,951 | 5/1998 | Audren | 310/323 |

FOREIGN PATENT DOCUMENTS

| | | | |
|---|---|---|---|
| 6-2998 | 1/1994 | Japan | H02N 2/00 |

*Primary Examiner*—Thomas M. Dougherty
*Attorney, Agent, or Firm*—Fitzpatrick, Cella, Harper & Scinto

[57] ABSTRACT

A vibration wave driving device includes a vibrating member that generates a vibration therein, and a rotary member which is in press-contact with the vibrating member and is rotated relative to the vibrating member by the vibration. The rotary member includes an external output portion located at approximately a center of rotation, a contact portion, and a radial compression portion that connects the external output portion and the contact portion and generates a compression force between the contact portion and the vibrating member. The thickness of the compression portion becomes larger from a middle portion toward the contact portion and from the middle portion toward the output portion.

16 Claims, 4 Drawing Sheets

FIG. 4
ANNULAR PLATE FIXED AT OUTER SIDE AND
LOADED ON FIXED ELEMENT AT INNER SIDE
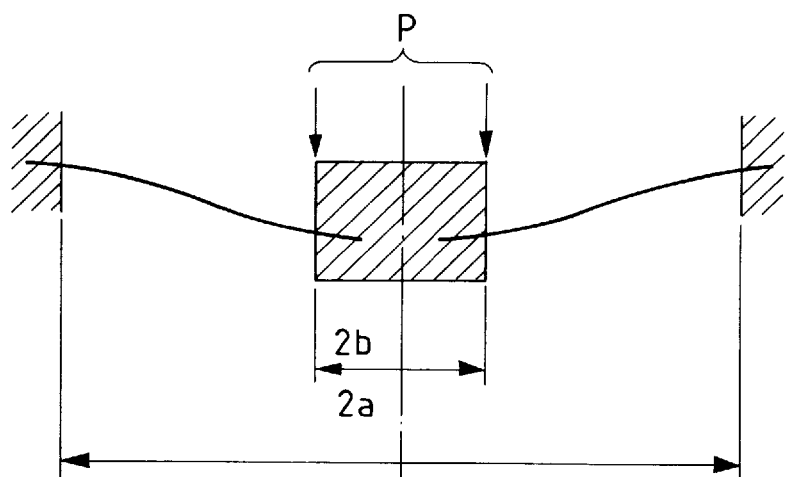
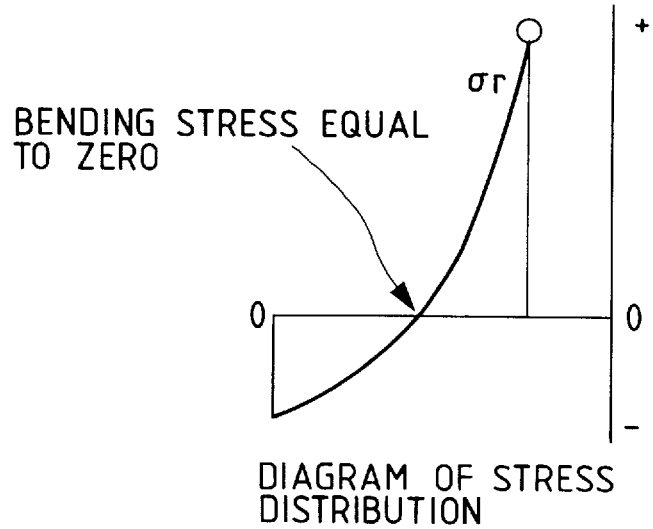
BENDING STRESS EQUAL TO ZERO
DIAGRAM OF STRESS DISTRIBUTION

VIBRATION WAVE DRIVING DEVICE AND APPARATUS HAVING THE SAME

BACKGROUND OF THE INVENTION

1. Field of the Invention

The present invention relates to a vibration wave driving device for driving a rotary member with a vibration wave generated in a vibration member.

2. Related Background Art

Recently, vibration wave motors (vibration wave driving devices) have been popularly used as driving sources for the lens barrel of a camera, the photosensitive drum of a copying machine, and the like. Such vibration wave motors include a vibrating member 1 made up of a piezoelectric element 4 fixed on the bottom surface of a ring-shaped elastic member 3, and a contact ring 2 that contacts the upper surface of the vibrating member 1 (elastic member 3), as shown in Japanese Laid-Open Utility Model Application No. 6-2998 and FIG. 5. The vibrating member 1 is fixed to a base member 10 by a screw 13. A slide member 7 is adhered on the surface of the contact ring 2. An annular plate spring 5 is arranged at the inner side of the contact ring 2, and a boss 6 coupled to an output shaft 11 is arranged at the inner side of the plate spring 5.

The contact ring 2, plate spring 5, and boss 6 rotate integrally to constitute a rotary member 14. In this rotary member 14, a slide member 7 adhered to the contact ring 2 is in press-contact with the vibrating member 1 at a predetermined compression force by elastically displacing the spring 5 toward the vibrating member 1 side, as shown in FIG. 6.

The plate spring 5 has a cross-sectional shape whose thickness increases from an outer side (contact ring 2) toward an inner side (boss 6), as shown in FIG. 6. FIG. 3 shows the deformation of an annular plate spring when the annular plate has a constant thickness and is simple-supported at the outer side (free-end supported) and is fixed at the inner side (fixed-end supported), and the inner side of the annular plate spring is loaded. FIG. 3 also shows the distribution of bending stress acting on the annular plate. As can be seen from FIG. 3, when the outer side is a free end and the inner side is a fixed end, the bending stress takes on a minimum value (zero) at the outermost side and becomes greater toward the inner side.

In Japanese Laid-Open Utility Model Application No. 6-2998, assuming that the plate spring 5 of the vibration wave motor shown in FIG. 5 has a free end at the outer side and a fixed end at the inner side, the thickness of the plate spring 5 is increased from the outer side toward the inner side, thereby avoiding concentration of stress at the inner side portion with large bending stress. Also, a largest possible displacement is assured by decreasing the thickness of the outer side portion with small bending stress.

However, the above reference and the vibration wave motor shown in FIG. 5 use a contact ring 2 which is formed to be considerably thicker than the thickness of the outer side portion of the plate spring 5, and this ring portion serves as a rim. For this reason, the outer side of the plate spring 5 is considered not as a free end, but as nearly a fixed end. Thus the deformation occurring when the inner side is a fixed end and the outer side is also a fixed end, and the stress distribution at that time becomes as shown in FIG. 4, produces a bending stress that assumes a maximum value at the outermost and innermost sides and a minimum value (zero) at the middle portion.

Hence, when the vibration wave driving device in the above reference and FIG. 5 is tested, stress concentrates on the joined portion (the thinnest portion of the plate spring 5) between the contact ring 2 and the plate spring 5 to cause fracture or creeping due to fatigue, and the compression force decreases, thus deteriorating the motor characteristics.

SUMMARY OF THE INVENTION

One aspect of the present invention is to provide a vibration wave driving device, in which a rotary member has a compression portion for producing a compression force between an outer-side contact portion that contacts a vibrating member, and an external output portion located in approximately the center of rotation, and the compression portion becomes thicker from its radially middle portion toward the contact portion and the output portion.

Other objects of the present invention will become apparent from the following detailed description of the embodiments.

BRIEF DESCRIPTION OF THE DRAWINGS

FIG. 4 shows the deformation of a spring which has a fixed end at the outer side and a fixed end at the inner side, and a diagram of the stress distribution;

DETAILED DESCRIPTION OF THE PREFERRED EMBODIMENTS (First Embodiment)

Figure 1:
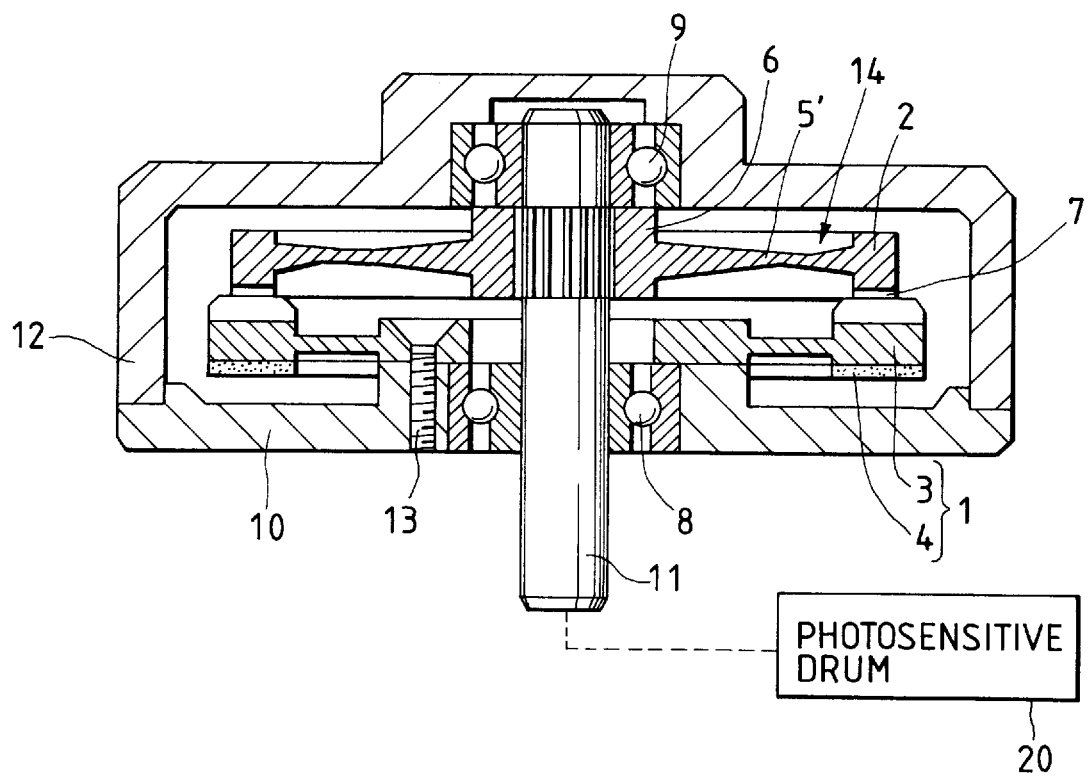
FIG. 1 is a sectional view of a vibration wave motor according to the first embodiment of the present invention.
Figure 5:
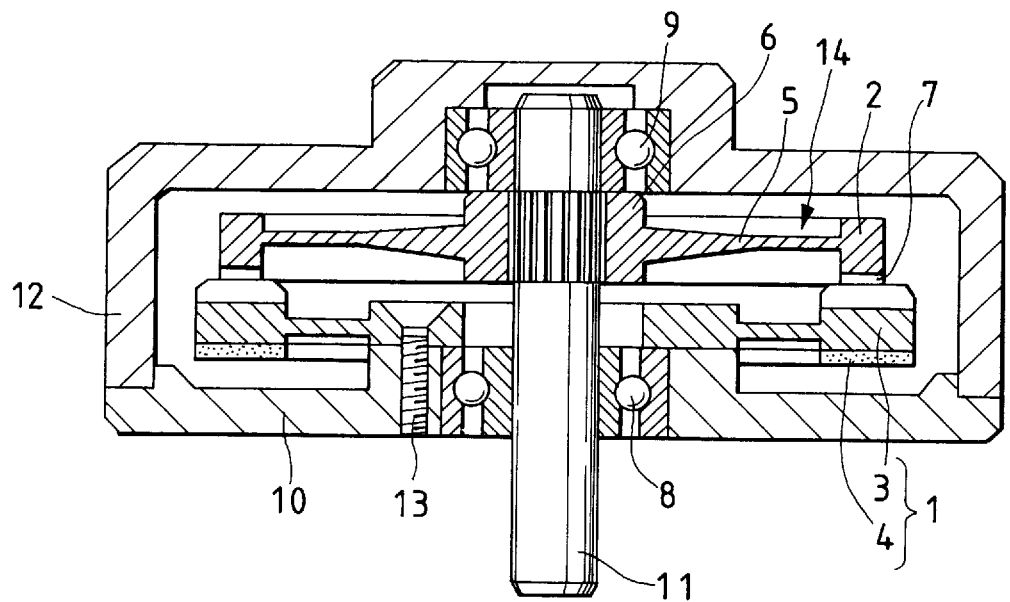
FIG. 5 is a sectional view of a conventional vibration wave motor.
Figure 6:
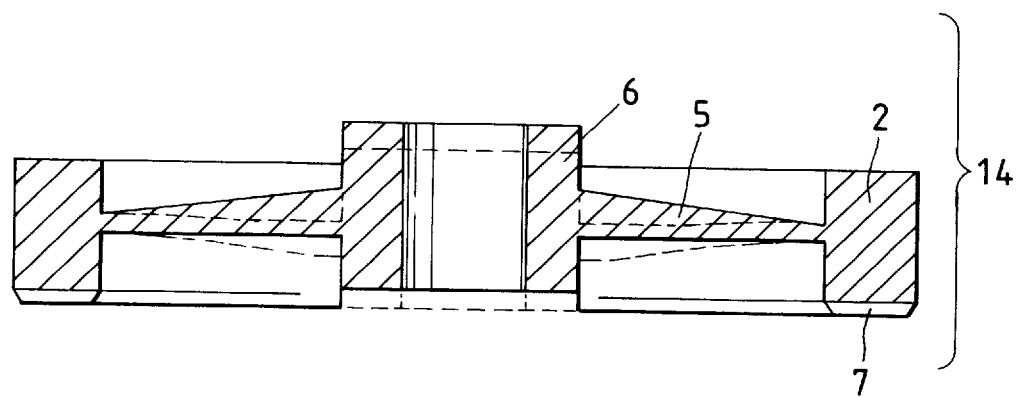
FIG. 6 is a sectional view of a rotary member of the conventional vibration wave motor.

FIG. 1 shows a vibration wave motor (vibration wave driving device) according to the first embodiment of the present invention. Note that the same reference numerals in FIG. 1 denote constituting elements common to those in the conventional vibration wave motor shown in FIGS. 5 and 6. A vibrating member 1 includes a ring-shaped elastic member 3, and a two-phase piezoelectric element 4 (electromechanical energy conversion element) fixed to the bottom surface of the elastic member 3, and is fixed to a base member 10 by attaching the inner side portion of the elastic member 3 to the base member 10 by a screw 13.

A rotary member 14 is formed integrally by a contact ring (contact portion) 2 that contacts the upper surface of the vibrating member 1 (elastic member 3), an annular plate spring (compression portion) 5' which is formed on the inner side of the contact ring 2 and extends in a direction (the right-and-left direction in FIG. 1) crossing the contact direction (the up-and-down direction in FIG. 1) of the contact ring 2 with respect to the vibrating member 1, and a boss (output portion) 6 which is formed at the inner side of the spring 5' and is spline-coupled to a motor output shaft 11. A slide member 7 is adhered on the surface of the contact portion to. The plate spring 5' produces a compression force for bringing the contact ring 2 into press-contact with the vibrating member 1 (via slide member 7) when its inner portion elastically deforms upon being pressed downward in the motor axis direction (a direction to approach the vibrating member 1) by an upper bearing 9 of the motor output shaft 11.

In the vibration wave motor with this arrangement, frequency signals having different phases are applied to the individual phases of the two-phase piezoelectric element 4 to excite a vibration in the vibrating member 1 (elastic member 3), thus producing a traveling vibration wave on the surface of the vibrating member 1. The contact ring 2 which is in press-contact with the vibrating member 1 via the slide member 7 is rotated by the vibration generated in vibrating member 1, and this rotation is transmitted to the motor output shaft 11 via the plate spring 5' and the boss 6, thus obtaining a motor output. Note that the motor output of this embodiment is used for driving a photosensitive drum 20 equipped in a copying machine.

Figure 2:
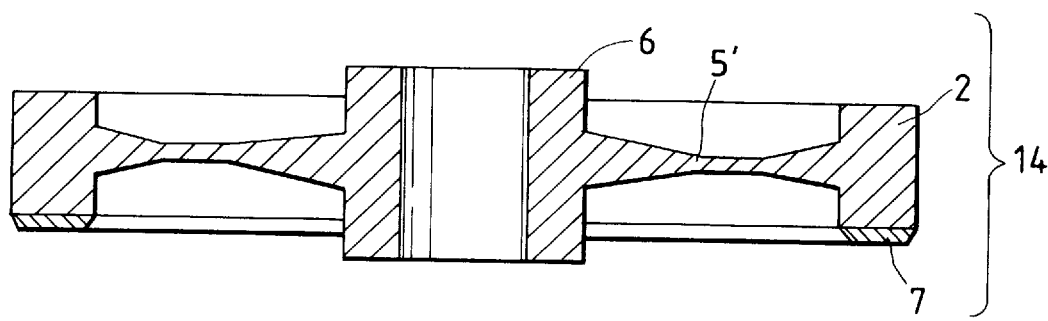
FIG. 2 is a sectional view of a rotary member of the vibration wave motor.
Figure 3:
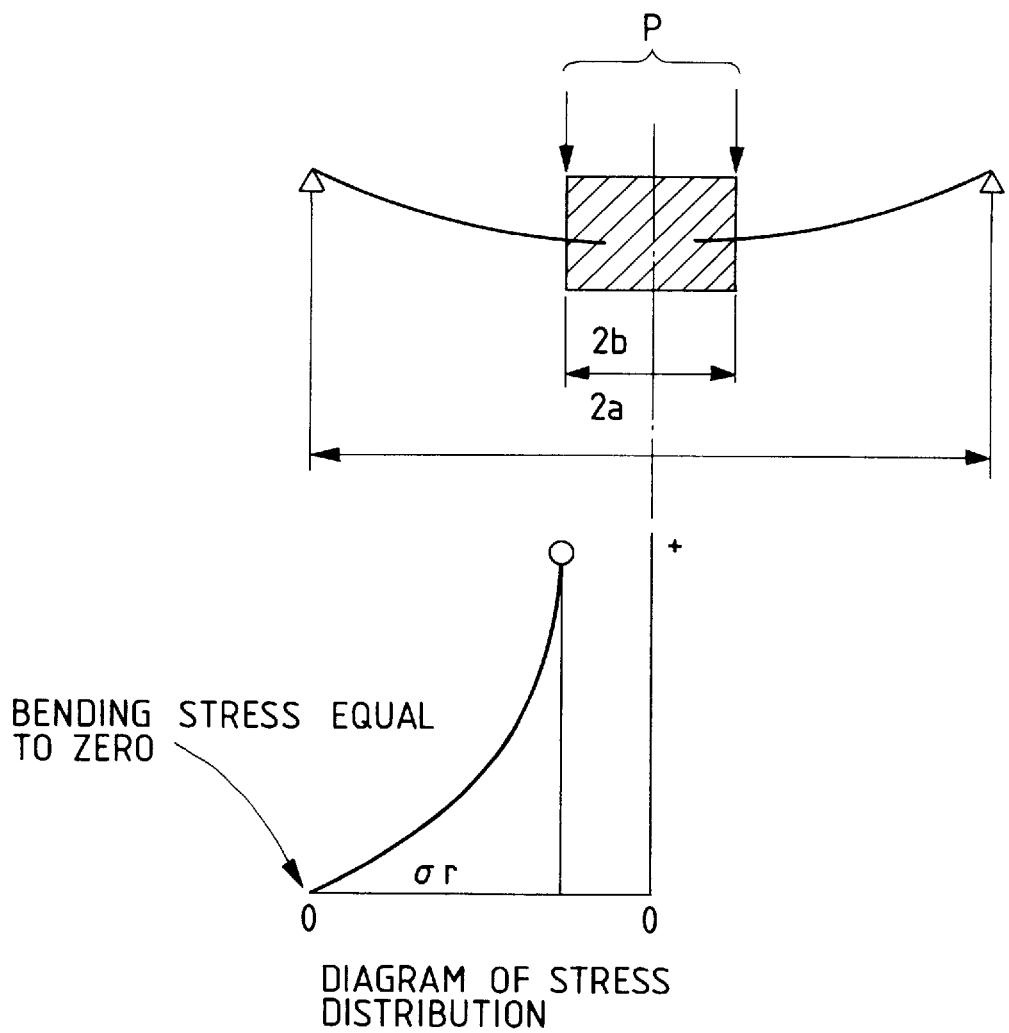
FIG. 3 shows the deformation of a spring which has a free end at the outer side and a fixed end at the inner side, and a diagram of the stress distribution.

Note that the plate spring 5' has a cross-sectional shape whose thickness is smallest at its radially middle portion, and increases from the middle portion toward the two ends (the sides of the contact ring 2 and boss 6), as shown in FIG. 2.

On the other hand, the bending stress acting on the plate spring 5' takes on a maximum value at the outermost and innermost sides and a minimum value (zero) at the middle portion, as shown in FIG. 4. More specifically, in this embodiment of the plate spring 5', the middle portion with small bending stress is formed to be thin, and the two end portions with large bending stress are formed to be thick.

Hence, according to this embodiment, stress concentration at the joined portions of the plate spring 5' with the contact ring 2 and the boss 6 can be prevented, and fracture or creeping of the joined portions can be avoided. For this reason, long-term, stable motor performance can be guaranteed, and the photosensitive drum 20 can be stably driven for a long period of time.

On the other hand, since the middle portion of the plate spring 5' can assure a sufficiently large elastic deformation amount, the contact ring 2 can contact the vibrating member 1 at a sufficiently high compression force, thus efficiently operating the vibration wave motor.

In the above embodiment, the plate spring of the rotary member is formed to have an annular shape. However, in the present invention, the plate spring 5' may be formed to have a beam shape radially extending from the boss 6.

In the above embodiment, the rotary member is integrally formed as a single piece including the contact ring 2, plate spring 5', and boss 6. However, in the present invention, the rotary member may be built by assembling separate elements including the contact ring, spring, and boss.

Furthermore, in the above embodiment, a ring type vibration wave motor has been described. However, the present invention can be applied to any other types of vibration wave motors.

As described above, according to the above embodiment, when the two ends of the compression portion, which are respectively joined to the contact portion and output portion, can be nearly considered as fixed ends, since the middle portion of the compression portion, where small bending stress acts, has a small thickness, and the thickness increases from the middle portion toward the two ends where large bending stress acts, a sufficiently large elastic deformation amount (i.e., a sufficiently high compression force) can be assured at the middle portion, and fracture and creeping of the two end portions can be prevented, thus obtaining stable performance over a long period of time.

When such vibration wave driving device is equipped as a driving source, an apparatus which has a driving system with stable performance and a long service life can be realized.

What is claimed is:

1. A vibration wave driving device comprising:
   a vibrating member that generates a vibration therein; and
   a rotary member which is in press-contact with said vibrating member and is rotated relative to said vibrating member by the vibration, said rotary member comprising an external output portion located at approximately a center of rotation, a contact portion, and a radial compression portion that connects said external output portion and said contact portion and generates a compression force between said contact portion and said vibrating member, wherein a thickness of said compression portion becomes larger from a middle portion toward said contact portion and from the middle portion toward said output portion.

2. A device according to claim 1, wherein said compression portion has an annular shape.

3. A device according to claim 1, wherein said compression portion comprises at least one beam.

4. A device according to claim 1, wherein said contact portion, said output portion, and said compression portion are integrally formed as a single piece.

5. A device according to claim 2, wherein said contact portion, said output portion, and said compression portion are integrally formed as a single piece.

6. A device according to claim 3, wherein said contact portion, said output portion, and said compression portion are integrally formed as a single piece.

7. A device according to claim 1, further comprising an output shaft, wherein said output portion is fixed to said output shaft.

8. A device according to claim 7, further comprising a fixed bearing that rotatably supports said output shaft in an axial direction, such that said compression portion generates a compression force for bringing said contact portion into press-contact with said vibrating member.

9. A device according to claim 8, further comprising a case member that supports said bearing, said case member encasing said vibrating member and said rotary member.

10. An apparatus for rotating an object to be driven using a vibration wave driving device as a driving source, comprising:
    a vibrating member that generates a vibration therein; and
    a rotary member which is in press-contact with said vibrating member and is rotated relative to said vibrating member by said vibration, said rotary member comprising an external output portion located approximately at a center of rotation, a contact portion, and a radial compression portion that connects said external output portion and said contact portion and generates a compression force between said contact portion and said vibrating member, wherein a thickness of said compression portion becomes larger from a middle portion toward said contact portion and from the middle portion toward said output portion.

11. An apparatus according to claim 10, wherein said compression portion has an annular shape.

12. An apparatus according to claim 10, wherein said compression portion comprises at least one beam.

13. An apparatus according to claim 10, wherein said contact portion, said output portion, and said compression portion are integrally formed as a single piece.

14. An apparatus according to claim 10, further comprising an output shaft, wherein said output portion is fixed to said output shaft.

15. An apparatus according to claim 14, further comprising a fixed bearing that rotatable supports said output shaft in an axial direction, such that said compression portion generates a compression force for bringing said contact portion into press-contact with said vibrating member.

16. An apparatus according to claim 14, wherein said output shaft rotates a photosensitive drum.

* * * * *

UNITED STATES PATENT AND TRADEMARK OFFICE
CERTIFICATE OF CORRECTION

PATENT NO.   : 5,834,878
DATED        : November 10, 1998
INVENTOR(S)  : Toru Nakanishi It is certified that error appears in the above-identified patent and that said Letters Patent is hereby corrected as shown below:

Title page, insert the following item:
    [30]   Foreign Application Priority Data
       Sep. 11, 1996 [JP] Japan....................8-240359

Signed and Sealed this

Second Day of March, 1999

Attest:

Q. TODD DICKINSON

*Attesting Officer*        *Acting Commissioner of Patents and Trademarks*

UNITED STATES PATENT AND TRADEMARK OFFICE
CERTIFICATE OF CORRECTION

PATENT NO. : 5,834,878
DATED : November 10, 1998
INVENTOR(S) : Toru Nakanishi

It is certified that error appears in the above-identified patent and that said Letters Patent is hereby corrected as shown below:

Column 1

Line 58, "Thus" should read --Thus,--.

Column 2

Line 58, "portion to." should read --portion 2.--.

Column 4

Line 59, "rotatable" should read --rotatably--.

Signed and Sealed this

Fifteenth Day of June, 1999

Attest:

Q. TODD DICKINSON

Attesting Officer     Acting Commissioner of Patents and Trademarks